(12) United States Patent
Richard

(10) Patent No.: US 8,032,573 B2
(45) Date of Patent: Oct. 4, 2011

(54) SYSTEM AND METHOD FOR MANAGING AND UPDATING DATA FROM A NUMBER OF SOURCES FOR A PROJECT

(76) Inventor: Philippe Richard, Calgary (CA)

(*) Notice: Subject to any disclaimer, the term of this patent is extended or adjusted under 35 U.S.C. 154(b) by 527 days.

(21) Appl. No.: 12/136,476

(22) Filed: Jun. 10, 2008

(65) Prior Publication Data

US 2008/0306973 A1 Dec. 11, 2008

(51) Int. Cl.
*G06F 17/30* (2006.01)
(52) U.S. Cl. .................. 707/999.01; 707/687; 717/162; 709/203
(58) Field of Classification Search .................. 707/650, 707/999.01, 687; 706/45; 717/162, 103; 709/203, 246; 719/328
See application file for complete search history.

(56) References Cited

U.S. PATENT DOCUMENTS

| 5,608,720 | A * | 3/1997 | Biegel et al. ................. 370/249 |
| 7,236,973 | B2 * | 6/2007 | Kalthoff et al. ............... 707/650 |
| 7,505,449 | B2 * | 3/2009 | Allen et al. .................... 370/350 |
| 7,509,326 | B2 * | 3/2009 | Krabel et al. ......................... 1/1 |
| 7,720,780 | B1 * | 5/2010 | Heidenreich et al. .......... 706/45 |
| 7,814,470 | B2 * | 10/2010 | Mamou et al. ................ 717/162 |
| 2008/0120129 | A1 * | 5/2008 | Seubert et al. .................... 705/1 |

FOREIGN PATENT DOCUMENTS

| WO | WO 2004/023287 A2 | 3/2004 |
| WO | WO 2004/023335 A2 | 3/2004 |

* cited by examiner

*Primary Examiner* — Jean M Corrielus
(74) *Attorney, Agent, or Firm* — Nelson Mullins Riley & Scarborough LLP

(57) ABSTRACT

The disclosure relates to a system and method for managing data from a number of systems. The method comprises: defining a set of objects for the data; defining a set of classes for the data; maintaining a catalog for each instance of the data; in the catalog identifying each instance's source system and its level of harmonization with other data; applying a set of harmonization rules to identify from the data a group of related data and an owner of the group; identifying differences in instantiations within the group; and initiating update requests to affected systems having the identified differences.

20 Claims, 13 Drawing Sheets

SYSTEM AND METHOD FOR MANAGING AND UPDATING DATA FROM A NUMBER OF SOURCES FOR A PROJECT

FIELD OF THE DISCLOSURE

The present disclosure relates to a system and method for managing, comparing, reconciling and updating and presenting data from a number of different sources for a project, in particular managing and reconciling data from different systems involved in managing workflow of a project.

BACKGROUND

In a large scale project, such as managing of an oil drill site or management of a large construction project, the project can be split into a number of different, but related, tasks. Each task may have different inputs, outputs, deadlines, criteria and lifespans. As such, a task is typically managed by a separate process. Different systems may be used to manage each task with separate entities responsible for each task. An entity may or may not be related to other entities in other tasks. Further, within each task a collection of different sub-systems (even paper-based data) may funnel data to the central management system for the task.

Many large corporate environments have information that is duplicated across many data sources. There are many solutions available when it comes to dealing with managing documents, but support for the on-going reconciliation of data stored in databases is very limited and the typical solutions require extensive manual synchronization processes or an expensive process of replacement and consolidation.

Frequently, data is applied to two or more tasks during the project (e.g. the target completion date for the project). When a task has "control" or superior rights to the data and the task determines that the data has changed, an updated version of the data needs to be provided to all tasks in the system that use the data. As an example, development and operation and an oil well site has several different tasks and issues, including: planning and approval (e.g. drill site approval, land access management, etc.), drilling and construction, production and regulatory (e.g. energy utility board, environmental approval, zoning approval, etc.). Typically, the planning task manages the processes for obtaining the required land access approvals for a proposed drilling site. After approval(s) are obtained and after completion of construction of the site, the actual production of may deviate from the original projected date. As such, the original regulatory approval(s) may (or may not) need to be updated. Similarly, land access rights may (or may not) need to be revisited.

Prior art data management systems do not effectively deal with managing data from different tasks. Some prior art management systems impose a data monitor with data write capabilities over the systems that they monitor. While some data write capabilities may be useful in certain circumstances, providing such capabilities introduce issues with ensuring that data management system properly interfaces with and updates the data of the local system and that the management system has the appropriate data privileges to update the data.

SUMMARY

In a first aspect, a method for managing data provided from a plurality of systems is provided. The method comprises: providing a set of objects for data; providing a set of classes for the data; maintaining a catalog with an entry for each data instance of the data; in the catalog, identifying for each data instance its source system and its level of harmonization with other data from the plurality of systems; applying a set of harmonization rules to the data to identify a group of related data and an owner of the group of data; identifying differences in instantiations in the group of data; and initiating an update request to an affected system of the plurality of systems having the differences. In the method, the data is accessable by a central data processing system which stores a copy of the data and selectively initiates the update requests.

The method may further comprise providing a hierarchical schema data model to track and map the data.

The method may further comprise establishing one or more workflows to provide rules and thresholds used to evaluate whether the data has been harmonized or not.

The method may further comprise: providing a domain model that is associated with the data that defines classes, properties and the set of harmonization rules for the schema data model; creating class libraries for use in the one or more workflows relating to the data; and assessing a level of harmonization following the set of harmonization rules for the group of data.

The method may further comprise mapping domain objects related to the domain model by. creating a list of fields that are used by the domain model; organizing the list of fields by source tables; loading each schema source referenced in the list of fields list and instantiating an appropriate schema extraction driver; and queuing data retrieval requests for processing.

The method may further comprise: determining whether or not to apply the set of harmonization rule to incoming data based on an evaluation of an integrity level for the incoming data; processing the data through the one or more workflows to determine whether the data has been harmonized or not; and generating a list of values from the data that have been identified as being acceptable by the one or more workflows.

In the method, the catalog may have a disposition field tracking the level of harmonization for the group of data.

In the method, the domain model may have a property field linked to a property object; and the level of harmonization may be determined from a comparison of a value for a property field for the data against properties of a property object associated with the property field.

The method may further comprise: after processing the data through the one or more workflows updating a copy of the data; and determining whether a value for the data is valid. The copy of the data may or may not be a local copy. The method may or may not update source of the data using an alias if the source of the data cannot be updated.

The method may further comprise: when the level of harmonization indicates that the data requires an update, initiating from a workflow a request to correct the data in the affected system, where the workflow is associated with domain classes and instances of domain classes.

The method may further comprise upon receipt of data from the plurality of systems: searching the catalog for an entry of the data; and if a match is found, then utilizing the set of harmonization rules to determine whether the entry should be replaced with the data, then replacing the entry with the updated data and selectively broadcasting the data to the plurality of systems.

In the method, the workflow may determine at least one of: types of changes that are allowed to the data; a threshold for determining a level of harmony to the data; and whether a fix process can be invoked to harmonize the data.

The method may be executed on a computer system.

In a second aspect, a system for managing data provided from a plurality of external systems is provided. The system comprises: a microprocessor; memory for storing the data; communication links to the plurality of external systems; a data structure stored in the memory providing a set of classes for the data; a catalog stored in the memory having an entry for each data instance of the data, the catalog providing an identification of a source system for each entry and a level of harmonization with other data from the plurality of systems; and a harmonization module. The harmonization module provides instructions executable on the microprocessor to: apply a set of harmonization rules to the data to identify a group of related data and an owner of the group of data; identifying differences in instantiations in the group of data; and initiating an update request to an affected system of the plurality of systems having the differences. In the system, the data is accessible by the system and the system stores a copy of the data and selectively initiates the update requests.

The system may further comprise a hierarchical schema data model stored in the database to track and map the data.

The system may further comprise one or more workflows providing instructions executable on the microprocessor defining rules and thresholds used to evaluate whether the data has been harmonized or not.

The system may further comprise: a domain model stored in the memory that is associated with the data that defines classes, properties and the set of harmonization rules for the schema data model; and at least one class library stored in the memory for use in the one or more workflows relating to the data. In the system, the harmonization module may further assess a level of harmonization following the set of harmonization rules for the group of data.

The system may further comprise a mapping of domain objects related to the domain model stored in the memory. The mapping may: have a list of fields that are used by the domain model; and organize the list of fields by source tables. The harmonization module may further: load each schema source referenced in the list of fields list and instantiate an appropriate schema extraction driver; and queue data retrieval requests for processing.

In the system, the harmonization module may further: determines whether or not to apply the set of harmonization rule to incoming data based on an evaluation of an integrity level for the incoming data; process the data through the one or more workflows to determine whether the data has been harmonized or not; and generate a list of values from the data that have been identified as being acceptable by the one or more workflows.

In the system, the harmonization module may comprise: a first harmonizer applied to the domain model to determine assignment of new data field values to domain objects; and a second harmonizer to process changes to data. The first harmonizer may be a factory harmonizer. The second harmonizer may be a model harmonizer.

In other aspects various combinations of sets and subsets of the above aspects are provided.

BRIEF DESCRIPTION OF DRAWINGS

An embodiment of as provided in this disclosure will now be described by way of example only with reference to the accompanying drawings in which:

FIG. 5a is a flow chart of a data extraction process used by the data management system of FIG. 1;

FIG. 5b is a schematic representation of an exemplary extraction queue data structure used by the data extraction process of FIG. 5a;

DESCRIPTION OF EMBODIMENTS

Figure 1:
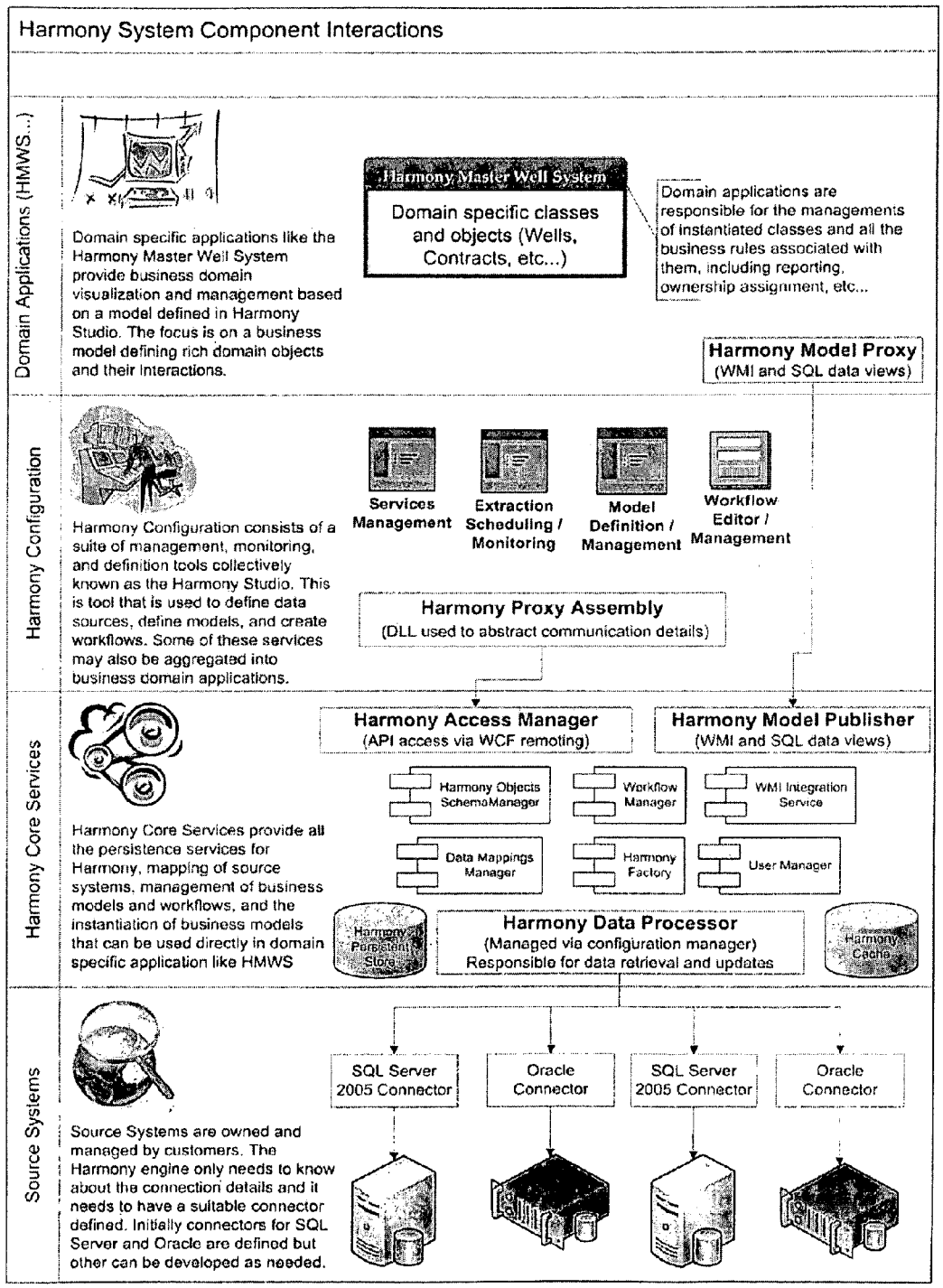
FIG. 1 is a schematic representation of components of a data management system according to an embodiment.

The description which follows, and the embodiments described therein, are provided by way of illustration of an example, or examples, of particular embodiments of the principles of the present disclosure. These examples are provided for the purposes of explanation, and not limitation, of those principles and of the disclosure. In the description, which follows, like parts are marked throughout the specification and the drawings with the same respective reference numerals.

Briefly, an embodiment provides cross-enterprise integration of data and a flexible data management system and methodology to provide accurate, integrated and scalable use, sharing and updating of data across the systems in the enterprise.

Referring to FIG. 1, an outline of the main tools of a data management system according to an embodiment are shown. There are four main inter-connected components that are provided/used by an embodiment: i) domain applications, which provide overall management of data systems for a defined business model; ii) configuration tools, which provide management, maintenance and data definition tools to define data sources and models for the system; iii) data collection and management tools; and iv) source data systems. Two external sets of information are used as part of components i) and iv). For the domain applications, the actual structure of the model for the domain applications is an external design provided to the embodiment. The domain applications codify, maintain and manipulate the model. For the source data systems, each system may maintains local sets of data and copies of sets of data that are accessed, processed and shared with other components, including other data systems, through an embodiment. Further detail is provided later on each of these components.

For the data sources, in an embodiment, a set of workflows rules is defined and codified to control instantiation of data from the data sources against the model. An initial set of rules may be predefined and amendments to the rules may be implemented using the configuration tools. During instantiation, data is retrieved from the data sources and is applied to the objects for the model. It will be appreciated that a particular class of data (e.g. "residential address"), may be tracked in several data sources (e.g. telephone directory listing, an employer's records, etc.). After each object has been instantiated, where there are multiple instances of a datum, an embodiment arbitrates (or "harmonizes") among the related data sources to determine a best "owner" (i.e. best source) for the data. As part of harmonizing the data sources, data exploratory probes are provided that can traverse through associated their data structure to determine associations of data elements to properties. As a data model restriction in the embodiment, a data field can be assigned to only one "property" (further detail on data models for an embodiment are provided later). An embodiment also provides a set of nested data harmonizers that use the structure of the data model and the associations determined by the probes to identify and correct data sourcing and data consistency issues. In an embodiment, a state of data ownership and harmonization for the model is determined by a "property" harmonizer and results from the other harmonizers that ultimately are activated up the hierarchy.

It will be appreciated that when there are multiple instances of data from several data sources, there may also be some inconsistencies among the instances (e.g. typographical errors, differing formats, etc.). As part of the data harmonization, an embodiment assesses multiple instances of data to attempt to determine a "real" value of the data. Once the real value is determined, it initiates update requests to the sources of the other instances. Also, an embodiment can identify data entries that are incomplete (when compared to other similar entries or do not have an associated "owner" and can attempt to resolve such irregularities or instantiation inconsistencies.

When a data object is "harmonized", there is deemed confidence in the data source and the contents thereby providing accurate and reliable reporting of the data throughout the model. However, for the embodiment, it preferably still has only read access to the data. Locally the data source has its read/write capabilities to modify the data. A local "fix-it" workflow operation may be activated at the data source to update the data itself. In one instance, the fix-it workflow may have a manual action by an authorized user provided to implement any data change, but this requirement can be changed to as needed.

Using the configuration tools, properties of objects can be managed and modified to add new data sources, create new meta-relationships among objects and modify existing properties.

There are four main processes involved in harmonizing data by an embodiment. Each is briefly described in turn.

First, data sources that are relevant to the domain need to be identified. The sources can include internal and external data sources, including public data. Ultimately, a schema is produced representing a map of the available data sources. The schema is used, in part, to create a domain model that will manage harmonization of the data sources. Generally, an initial definition of a domain model begins with a small number of data sources (e.g. less than 10), but the number can be expanded dynamically over time as the domain model expands.

A review of the data sources can provide a data map providing a machine and source independent map of the data structures accessible by the embodiment. For each element in the map, relevant attributes are also noted, such as the data type, access permissions, indices, constraints and relationships with other data.

The second process defines a domain model. Defining a domain model consists of defining a hierarchy of meaningful business objects and their relationships, then mapping data fields from one or more schemas to these objects. Part of the model utilizes a hierarchy of constructs called harmonizers, which are data agents used to map data to objects, assign ownership, and determine whether a state of harmonization for the data.

The third process assigns data from the data sources to objects in the model using information relating to the data sources specified in the schemas. When data is first retrieved the domain model uses the harmonizers associated with each domain class to determine whether a new business object needs to be created. If the object already exists the data is passed to the appropriate existing object. If the data cannot be mapped to a business object an exception processing harmonizer is invoked to process the data.

For the fourth process, the objects for the model are deployed. Once a data field has been assigned to a new or existing business object a state of harmonization is achieved, where any change to data is controlled by its underlying data source, following local data management rules executed at the data source.

Further detail is now provided on each of the four processes.

For the process of identifying data sources, the data management system of an embodiment needs to be able to access a listed data source and retrieve the target data from it. The data source can be defined in terms of its connection parameters, including its related server, the communication protocol, the communication port, etc. A GUI interface is provided by the data management system to allow registration of new data sources for the system. The interface has flexibility to allow new data sources to be added.

The information about the data sources is stored in a local database for the system. The collective information provides a schema of all the data that can be accessed by the system for a given model. The connection information for each data element is the root of the schema.

Figure 2A:
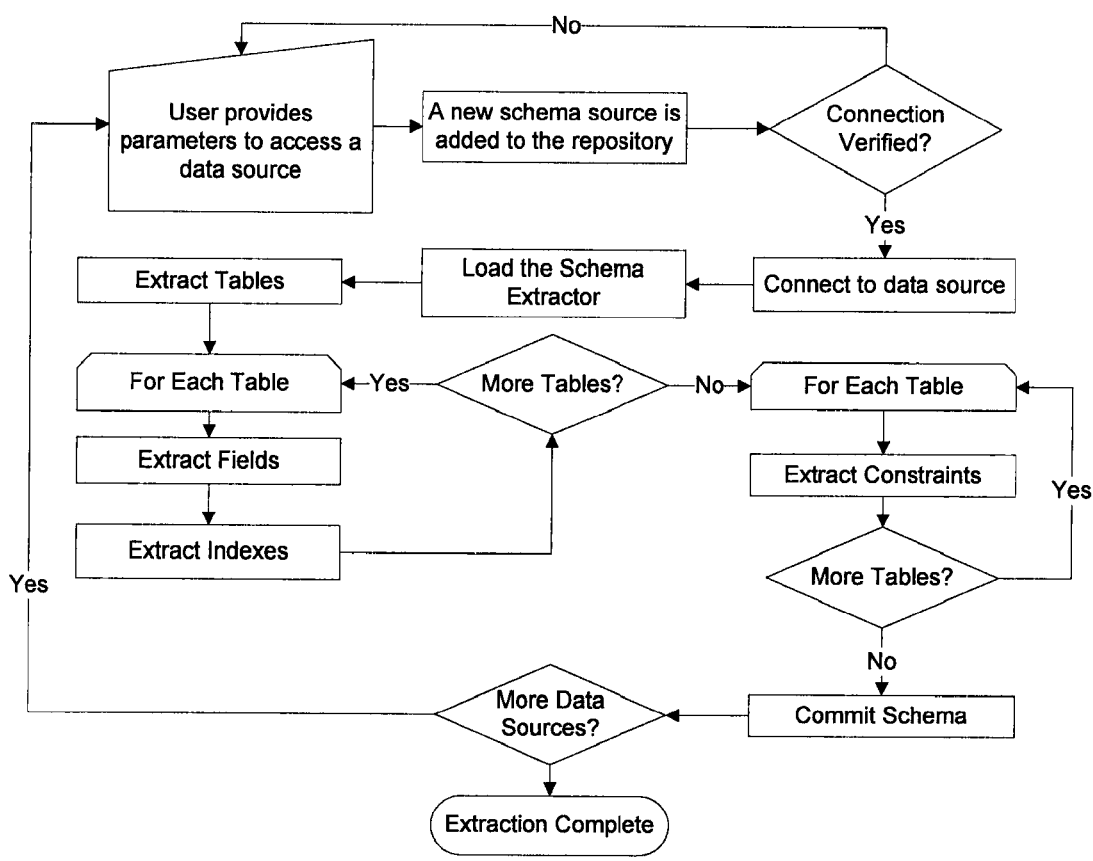
FIG. 2a is a flow chart of a schema discovery/extraction process used in the data management system of FIG. 1.
Figure 2B:
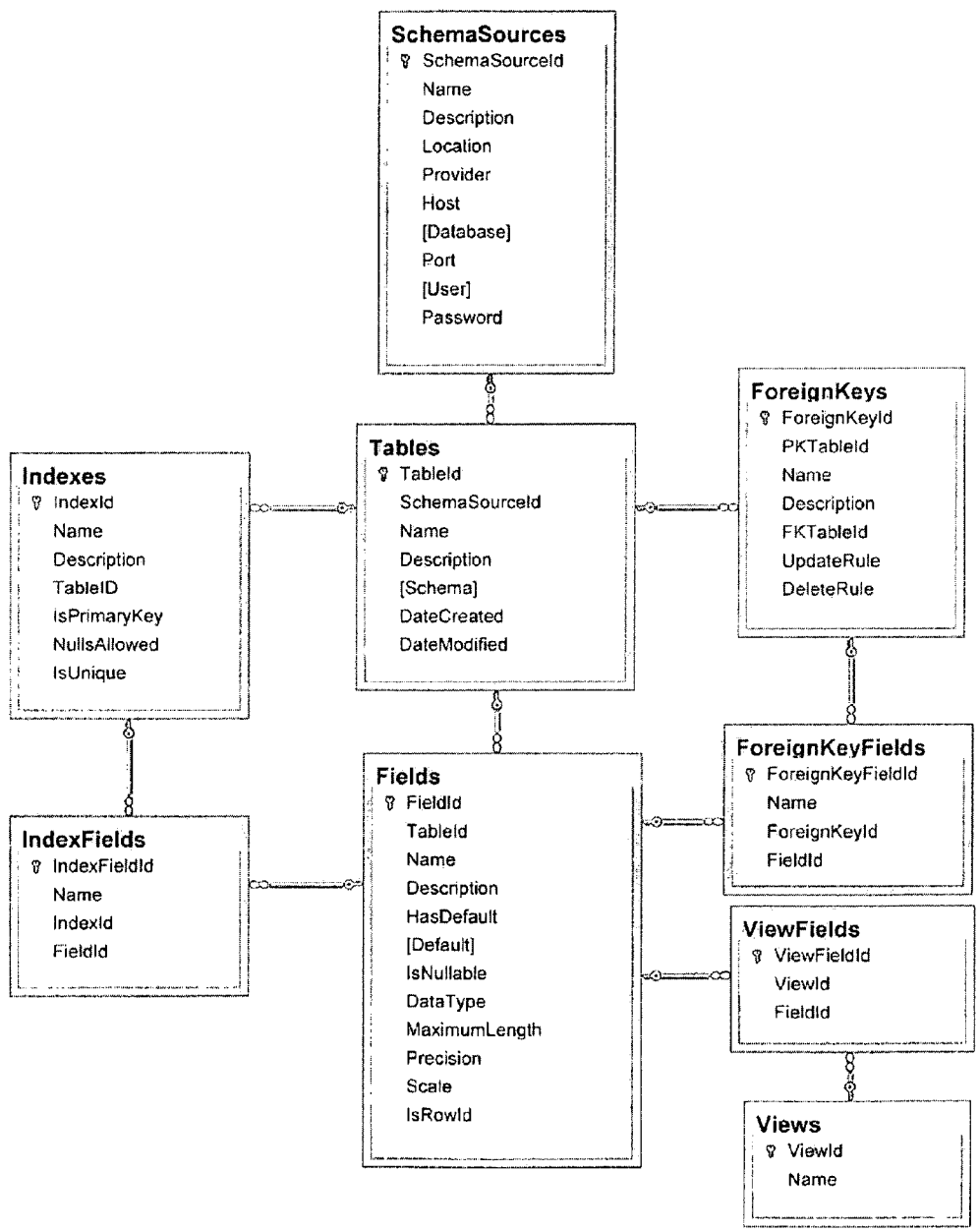
FIG. 2b is a schematic representation of an exemplary template of a schema data structure used in the data management system of FIG. 1.

Referring to FIGS. 2a and 2b, a discovery process is then executed to retrieve connection information about all data sources. As different data sources may utilize different data formats (e.g. SQL, Oracle etc.), an embodiment may need to provide appropriate commands to query the local database and extract and interpret the results. As such, an embodiment provides an interface "driver" for each type of database. The interface converts commands from the system into a local equivalent command for the target database server, converts any messages from the server to standardized messages for the system and converts the output received from the server into a standardized format. A top-level set of interfaces is provided on the system to allow it to access the required schema information. The schema extractor uses an interface, such as a factory pattern, to provide flexibility in accessing different data types and sources. A factory pattern is a design pattern that separates the abstract interface that provides the methods used to perform extraction from the actual implementation. This allows an embodiment to support new types of data sources and it also simplifies the underlying software that processes the related data. As part of the data processing by an embodiment, the structure used by the system for tracking data may be an object or table, but may also be captured in a different data structure to suit the needs of the model.

Referring to FIG. 2a, first, a user provides parameters to access a data source. Then a new schema source is added to the repository. Next, the connection is verified. If the verification fails then the process returns to having the user provide the parameters to access a data source. If the connection is verified, then a connection is made to the data source and the schema extractor is loaded. Thereafter, the tables are extracted and for each table the fields are extracted. A series of sanity checks is conducted for the extracted field. Therein, all of the fields for a data source are first extracted to determine whether any foreign constraints will be able to reference the related fields across tables. A foreign constraint is imposed from a "foreign" source. For example, a customer list may have a list of addresses. It is possible for different customers (perhaps from the same family) to share the same address. For the data model, it is possible to assign a unique identification tag to addresses and assign that identification (ID) tag as an "AddressID" for each customer at the same address. In the related schema data model, a foreign constraint would be used to specify that the AddressID in the customer table must reference a valid AddressID in the related Addresses table. When all the fields are extracted, then the indexes are extracted. Once all tables are extracted, then for each table a constraints are extracted. As part of the mapping, a set of indexes are maintained to map the domain objects and run the models. The indexes provide unique identifiers for the rows of data extracted into the system. Once all constraints are extracted for all tables then a schema is committed. This is repeated for all data sources. Once all schemas have been extracted for all data sources then the extraction is complete.

Also, the extraction process maps any native data types of a particular data source to a standardized data type so that the data can be internally stored and processed by the system. The data type mapping routines allow custom data types to be introduced either during the initial extraction process or later, as needed.

Referring to FIG. 2b, each schema source used by an embodiment is embodied in a set of linked objects, including objects for:

SchemaSources
Tables
Fields
Indexes
Index fields
Fields
Foreign keys
Foreign key field
View fields
Views Each object has a series of subobjects within. Each object may be related or linked to one or more objects in one or more parent:child relationships (shown as ∞:"key" relationships or N:1 relationships with the "key"ed relationship listed in the objects). Notable objects include the "Indexes", "Tables", "Fields" and "SchemaSources" objects.

Each schema source starts with an entry in the SchemaSources object. The SchemaSources object describes information required to establish a connection to the database. While not all the parameters may be needed for every type of data source, at minimum a unique name should be defined. The provider field identifies the specific data interface "driver" (described later) to use when connecting to the data source. Every instance of a SchemaSource is described in terms of one or more objects. Every object may have one or more indexes. If an index exists that is flagged as a "IsPrimaryKey" index, that index is used to uniquely identify each row during the data extraction process. Every object may have one or more foreign constraints. Foreign constraints provide information that may impact the deployment of automatic updates to schema sources and the information is stored to assist analysts who may configure automatic update scripts.

Figure 3A:
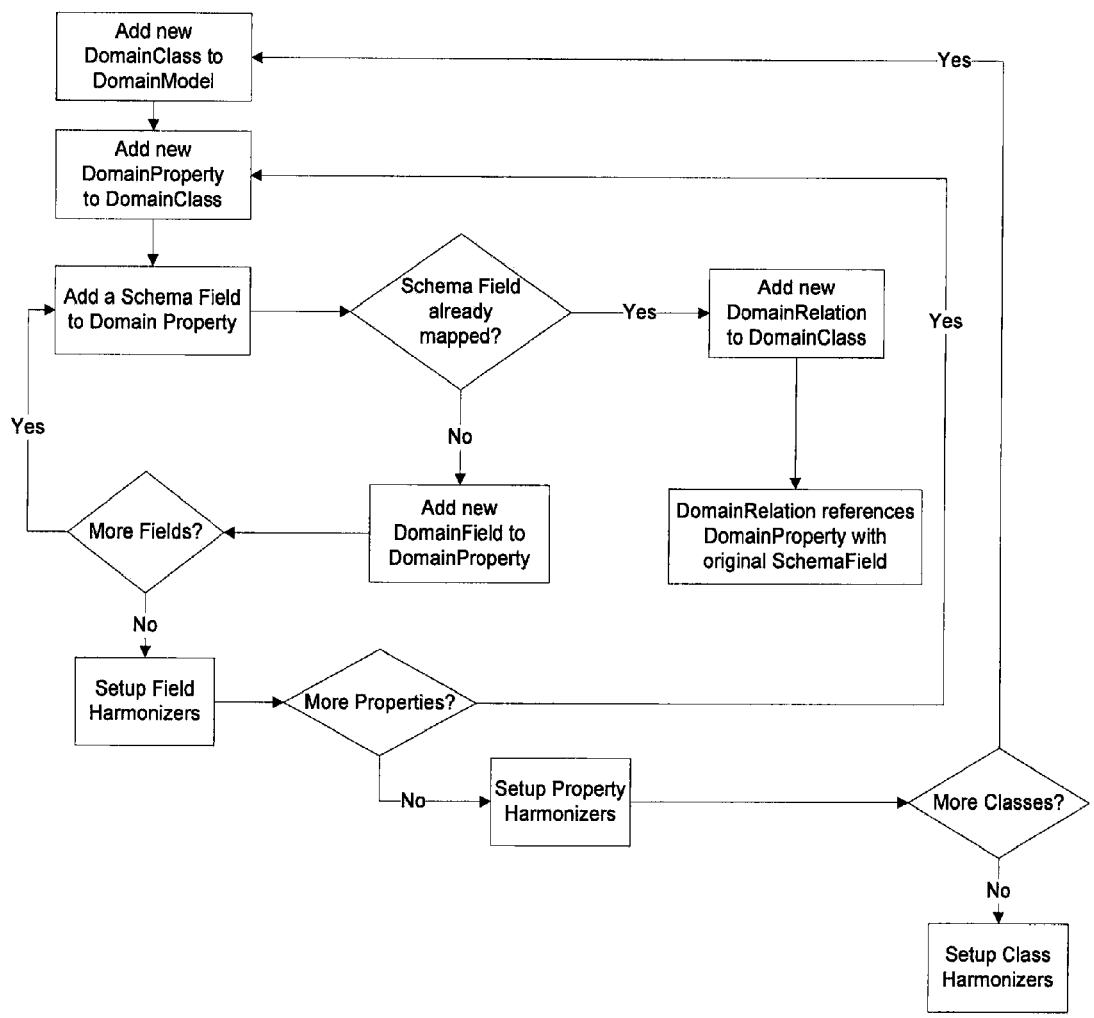
FIG. 3a is a flow chart of a domain modelling process used in the data management system of FIG. 1.
Figure 3B:
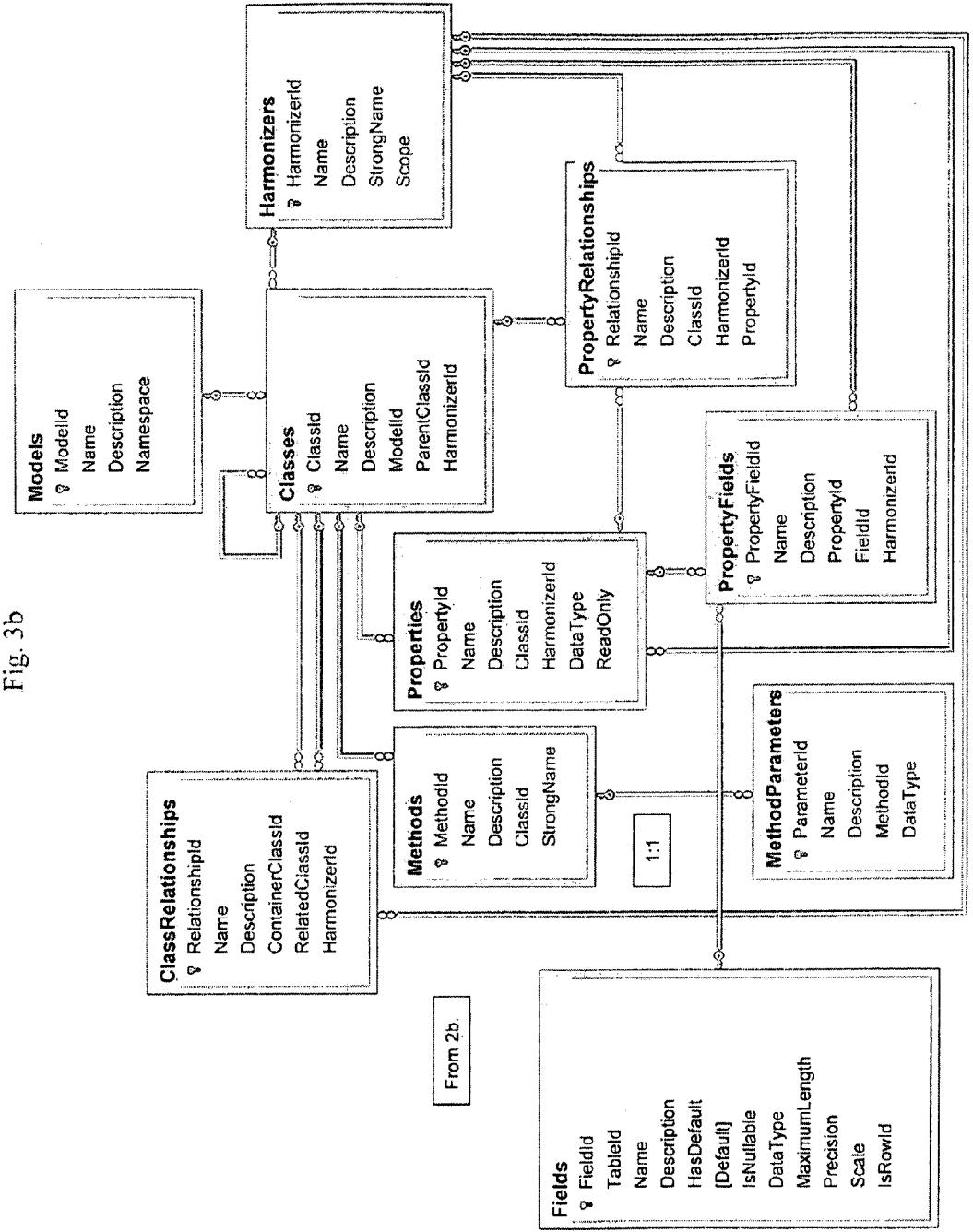
FIG. 3b is a schematic representation of an exemplary template of a domain model data structure used in the data management system of FIG. 1.

Referring to FIGS. 3a and 3b, the domain modelling process may be initiated after a sufficient number schemas have been extracted by the system, for example at least two or more schemas. An extraction threshold may be set for a given modelling process and may be 1, 2, 3, 4, or more etc. schemas. The threshold may be determined by any combination of numbers of schemas, types and amount of data extracted. A domain model may begin as an off line definition of a set of modeling rules that will be captured in the system. The rules are used to define how and what data from the schema is accessed, to provide constructs as to how to interpret and attribute the data, and to arbitrate and address data inconsistencies.

The domain model is a data structure comprising a set of linked classes, properties, methods and "harmonizer" parameters. For a given model, its data structure may have customized fields linked and defined in a manner which reflects the desired relationships for the elements in the model. The structure follows object-oriented design principles with child objects being linked to a parent object(s) in an N:1 configuration, where N is greater or equal to 1.

Domain classes are top level constructs of the structure and can inherit attributes from pre-existing classes. Initially, each domain class needs to be assigned at least one property. Domain classes may also be used to define custom methods and relationships to other classes, which can be defined to support the running model and to allow harmonizers to access related information during harmonization of the data by an embodiment. Further details on the components of a domain model are provided later. Domain classes are used to define business objects that are of interest to the domain being modeled. In an embodiment, they provide the primary mean of organizing and defining a domain model. Domain classes are described in terms of properties (for example a domain class "Customer" may have properties like "FirstName", "LastName", "CustomerNumber", etc. Properties are defined by one or more PropertyFields. A PropertyField links a specific FieldID (from a SchemaSource) to a Property. For example, a "CustomerNumber" property field may be linked to a "CustomerId" field in a "Customers" object. That "CustomerNumber" property field may also be linked to a "CustomerNumber" field in another object, such as a "CustomerHistory" object.

Referring to FIG. 3a, a modelling process is as follows. First, a new DomainClass is added to the DomainModel. Then, a new DomainProperty is added to the DomainClass. Then, a Schema Field is added to the DomainProperty. If the Schema Field is already mapped, then a DomainRelation is added to the DomainClass and then new DomainRelation references are made to DomainProperty with the original Schema Field. If the Schema Field is not already mapped, then a new DomainField is added to the DomainProperty. Then, if there are more fields to be added the process returns to adding a Schema Field to a DomainProperty. If there are no more fields to add, then the process proceeds to set up Field Harmonizers. If there are more properties to be analysed, then the process returns to add another new DomainProperty to DomainClass. If there are no more properties, then the process sets up Property Harmonizers. Then, if there are more classes, the process returns to adding a DomainClass to DomainModel. Otherwise, the process sets up Class Harmonizers.

Referring to FIG. 3b, each model used by an embodiment is defined by a series of linked objects, including:

Models
Classes
ClassRelationships
Methods
MethodParameters
Properties
PropertyRelationships
PropertyFields
Fields
Harmonizers Each object has a series of subobjects within. Each object may be related or linked to one or more objects in one or more parent:child relationships (shown as ∞:"key" relationships or N:1 relationships with the "key"ed relationship listed in the objects).

For an embodiment, an important rule of harmonization is that a FieldID from a schema source may only be assigned to exactly one PropertyField. Referring to FIG. 3b, the Fields table is provided from the data model in FIG. 2b and it has a 1:1 relationship with the PropertyFields table. This helps to prevent introduction of data racing issues.

When a new domain class is defined that need to reference a field that is already mapped, a PropertyRelationship is created. The PropertyRelationship is used to indicate that the new domain class uses the property, but is not the authoritative source of the underlying data. For instance a CustomerID may be part of a PurchaseOrder, but the field is actually defined (and "owned") by the Customer domain class.

The top level constructs of a domain model are its domain classes. Domain classes may inherit items from pre-existing classes, akin to objects in object-oriented models. Each domain class is made up of at least one property. Domain classes may define custom methods and relationships to other classes.

To maintain data integrity, some restrictions may need to be imposed on some elements in the model to ensure certain order, such as a clear chain of ownership of data elements in the model. In one embodiment, the following restrictions may be imposed: (1) a schema field can only map to one property field; (2) a FieldID from a schema source can only be mapped to a single instance of a PropertyField; and (3) if a domain class needs to reference a FieldID that is already mapped to a different domain class, then a PropertyRelationship is created that refers to the property that contains the PropertyField referencing the desired FieldID.

Figure 4:
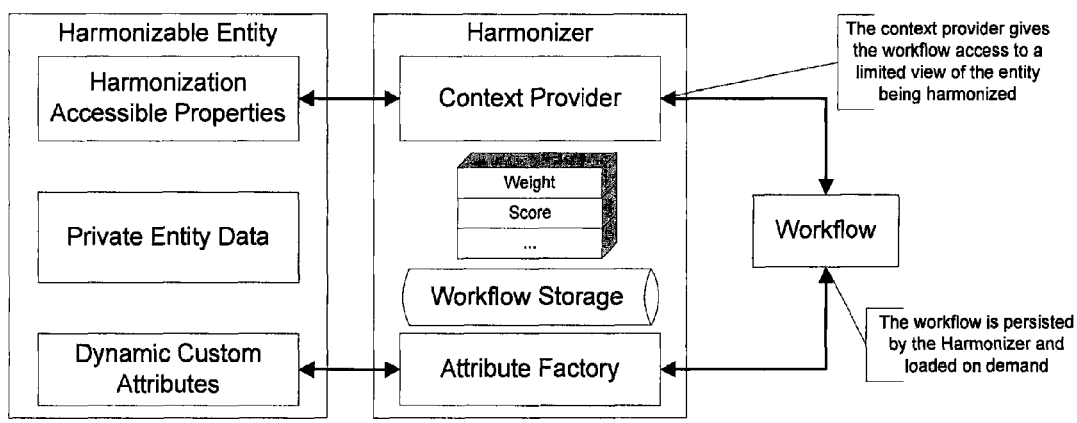
FIG. 4 is a schematic representation of an exemplary harmonizer template of a domain model data structure used by the data management system of FIG. 1.

Referring to FIG. 4, harmonizers are shown. Data harmonization traverses the data schema in a logical manner to identify relevant data elements, track, rank and harmonize them. In the embodiment, the traversal is done in a bottom-up manner. Other embodiments may use different traversal algorithms. The harmonizer objects in the data schema provide the following roles in the harmonization process:

They separate harmonization workflows from the domain objects, as a harmonization workflow may impart an unintended effect on a domain object.
They are used to control aspects of the domain model that are accessed by the harmonization process.
They expose user level extensibility features that allow authorized user to create custom attributes that can be associated with any harmonizable domain construct (domain class, property, property field, and any instances thereof). This provides support for business domain specific features such as lifecycle management, state related attributes, and custom properties that may be useful for reporting and analysis purposes.

During the process of assigning schema field values to domain objects, harmonizers participate in a nomination process that determines whether to create a new domain object.
When changes are detected in schema field values already associated with domain objects, harmonizers initiate a scoring function to evaluate the state of harmony of an object.

A harmonizer has a list of properties, data and attributes. It can modify its associated domain class or the specific instance of that domain class. The harmonizer exposes methods that the workflow can use to define and manipulate these additional properties and it may also expose a subset of the attributes of its associated object. In effect, a harmonizer provides a filter to restrict access of the workflow to its permitted attributes needed for harmonization. The harmonizer also has a context provider and an attribute factory. The context provider acts as a filter on the object it is associated with to control what a workflow can access and change. The attribute/property factory is used by the workflow to add business domain specific attributes and property domain model object.

The embodiment implements two types of harmonizers: a first harmonizer is a factory harmonizer; a second harmonizer is a model harmonizer. A factory harmonizer is used by a domain model to determine the assignment of new data field values to domain objects. It also is used during creation of new business object instances. In an embodiment, use of a factory harmonizer may be restricted for domain modeling objects (domain classes, properties and property fields). A model harmonizer processes changes to data that is already associated with a business object. In an embodiment, a runtime harmonizers may be restricted in use. For example they may be restricted such that they may only be used with instantiated domain model entities (domain objects and their associated properties and property fields). A harmonizer has an embedded workflow object that defines its runtime behaviour. The workflow object may be edited by business users. The workflow object accesses the underlying domain model through generated classes of code that are instantiated once the modeling is completed.

Figures 5A, 5B:
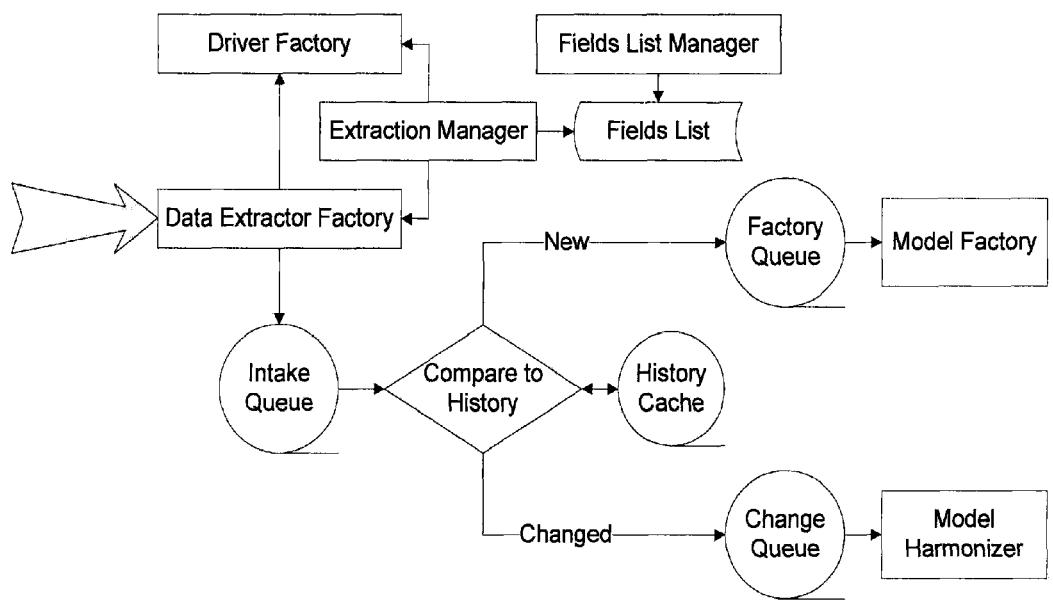

Referring to FIGS. 5a and 5b, after schema sources have been mapped to the domain model, code has been generated and the harmonizers have been configured, data can be extracted from the data sources to begin mapping of domain objects. The data extractor comprises the following components: driver factory, fields list manager, data extractor factory, extraction manager, factory queue, intake queue, history cache and change queue. A driver factory loads the specific driver that is used to establish a connection to the data source specified by the datasource field of the schema source. A fields list manager maintains a list of the fields that are mapped to propertyfields in domain models and constructs a list of fields to be retrieved from each table in a schema source. A Data Extractor Factory loads the module that implements the abstract data extraction interface so that the data is extracted from the specified schema source. An extraction uses the driver factory and the data extractor factory to manage data extraction of the fields defined by the fields list manager. The extraction manager operates on a schedule defined by the system administrator for the data management system of an embodiment.

When a new data field is retrieved that is not assigned to a specific instance of a property field it is added to the factory queue for processing. In an embodiment, the factory queue is a first in I first out (FIFO) buffer. The data is processed by the propertyfieldID associated with the SchemaSourceFieldID specified in the queue.

The embodiment also maintains a history cache. Once a data value has been processed by the property field and the data is associated with a running instance of domain class (through a "Property" of that class that contains the property field) the history cache record is updated to have the DestinationID reflect the identification of the PropertyField instance).

An embodiment also has an intake queue, which is used by an extraction manager. All of the data received by an extraction manager is placed in the intake queue. The data is in the intake queue is processed in two steps. First, the extraction manager provide additional tagging information to the data, including a retrieval date, a data type (as provided in the "Field" entry of the schema source), a value (taken from the schema source), and a source field ID (as provided from the fields list). A disposition field is used to indicate the status of the processing of the data. Initially, the disposition field is set to "RAW", indicating that the record is unprocessed. Also, the destination identification field is set to NULL. The second step examines each entry's source field identification in the history cache. If no entry is found, then: i) the data's disposition is changed to NEW; ii) the record is moved to the factory queue; iii) a copy is added to the history cache; and iv) the record in the intake queue is deleted. If an entry is found, then the value of the entry is compared to the record in the history cache. If the record is found to be unchanged, then the history record retrieval date is updated and the record in the intake queue is deleted. However, if the value in the history record differs, then: i) the disposition is changed to CHANGED; ii) the DestinationID is set to the value in the history cache Record; iii) the record is moved to the change queue; iv) the history record is updated with the new value along with the retrieval date; and v) the intake queue record is deleted. This processing of data continues until the intake queue is empty.

The history cache contain records that have been retrieved and their last dispositions. It is used to decide how to handle records entering the intake queue.

A change queue is used to store data that is retrieved that is already assigned to a specific instance of propertyfield. The change queue is a FIFO buffer that holds data for processing by the INSTANCE of the PropertyFieldID that is specified in the DestinationID.

The data extractor builds a list of the data fields that are used in a model and then it extracts the data from the data sources and feeds it to the harmonization process.

One data extraction process comprises the following steps:
1. Create a list of schema fields that are used by domain models using the fields list manager.
2. Organize the list of fields by source tables and store the list for use by the extraction manager. This results in a list of fields for each source table from which information is to be retrieved. The actual extraction can occurred on a scheduled basis through the extractor factory or the schema source can be configured to fire an event when new or changed data is available. A data change event triggers step 4 to occur.
3. On predetermined frequency (e.g. based on time or events or a combination of both), the extractor factory accesses the driver factory to load each schema source referenced in the fields list. Next, then the extractor factory instantiates the appropriate schema extraction driver and queues data retrieval requests for processing.
4. New data enters the intake queue for processing. In the embodiment, a data extraction manager triggers the process. The trigger may be on demand, according to a schedule, or in response to an event triggered by an external event. As described above, the intake queue is compared to the history cache to determine the appropriate disposition of the data.
5. New data elements are moved to the factory queue for processing by the model factory.
6. Data already associated with a domain object that has changed is moved to the change queue for processing by the model harmonizer.

The steps may be executed in a different order in other embodiments.

The domain model factory processes new data field values and assigns them to an appropriate domain object. The key goal of the mapping process is to assign ownership of every new field value that is retrieved. Field values that have already been assigned to a domain object are automatically handled by the runtime harmonizers associated by the object as part of the domain runtime processing described in the next section.

Figure 6A:
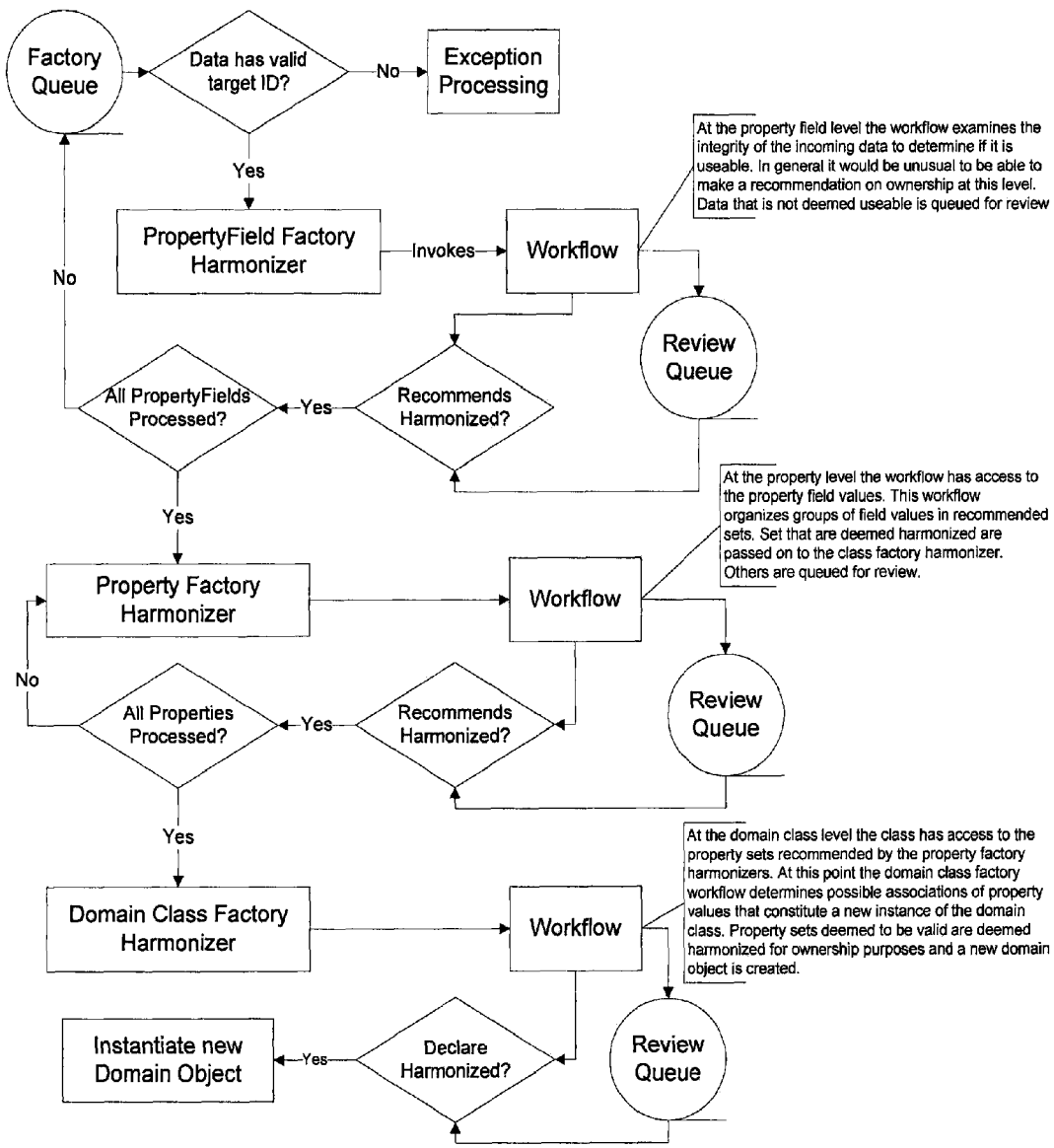
FIG. 6a is a flow chart of mapping process to map domain objects used by the data management system of FIG. 1.

Referring to FIG. 6*a*, the model factory takes data from the factory queue and processes the entries as follows. As noted, harmonization works from the bottom up in the data schema. As such, data is harmonized from fundamental objects upward. First, the data is checked to see whether it has a valid targetID. If not, the data element is rejected. The target IDs are defined in the schema source and domain model tables. This is an error state that should not occur unless there was an attempt to process a list of fields intended for a different model.

Next, if the data has a valid targetID, then the propertyfield harmonizer may be activated, which then invokes its set of workflow rules. At the propertyfield level, the rules examine the integrity of the incoming data to determine if the data is useable. Whether data is useable or not may depend on parameters of specific business model domains. For example, a data may be a field that contains general ledger account codes and its format may determine whether it represents an valid type of account code. This is a low level process and in most instances there may be no determination to be made beyond a simple match of the datatype (an integer, a Boolean value, etc.). Data that is deemed not useable is queued for later review. If a data instance is rejected, then he propertyfield stores it and makes it available for review by the data/system administrator through a graphical user interface for viewing all exceptions. The administrator may then determine which instance (if any) should own the data and then provide appropriate override commands to the system. After the workflow is finished for that propertyfield, its final step is to determine whether or not harmonization should be conducted for that propertyfield. One criteria that can be used to determine whether or not to harmonize is source of the criteria. Other criteria may be used according to the business model. In the embodiment, the domain model has a PropertyField that has a harmonizer object. The harmonizer object contains a customizable workflow that provides codified rules that are applied and analyzed to determine whether harmonization has been achieved or not. As noted earlier, the harmonizers are nested at different levels. At the level of a PropertyField, such workflows can only determine whether the data is reasonable as a value for the PropertyField. After the analysis of the harmonization at this level, a list of values that have been deemed reasonable for the PropertyField is generated. In some harmonization regimes, simple data types may rely on default workflow processing and automatically accept the values. Each PropertyField is processed in the same manner.

Once all propertyfields are processed, the property class is harmonized. At the property level, the rules organize the groups of field values into recommended sets. Sets that are deemed to be harmonized are passed to the class factory harmonizer. Others are queued for review. An analysis of the relationships among the data fields and classes is conducted to determine how to group fields into the recommended sets and whether a set should be harmonized. At the property level, harmonization may simply be matching the values being proposed for the PropertyFields associated with the Property. Processes to implement such harmonization may be to find the same value in each PropertyFields and line them up. The workflow develop a related set of rules and processes to identify, assess, and categorize typographic errors, transcription errors, proximity patterns in the data and others, as appropriate. Preferably, the property ONLY has access to the values in the PropertyFields it owns; the property does not make assessments that would require access to other properties. For example, an ONLY property that defines GPS coordinates could be restricted from having access to another property in the same domain class that defines longitude and latitude.

After the workflow is finished for that property, its final step is to determine whether the data should be harmonized. Sources and triggers for criteria to determine whether to harmonize or not are dependent on the model of the system. A primary goal of harmonization at this level is to match values from the various PropertyFields associated with the Property. For further harmonization, the overall workflow may have a rule that a CustomerID needs to exist in every PropertyField to for the property to be considered useable. Alternatively or additionally, the workflow may deem that as long as the CustomerID value that comes from the Customers table is present that is sufficient for harmonization. Each property is processed in the same manner.

Once all properties are processed, the domain class is harmonized through its rules. At the domain class level, the class has access to the property sets recommended by the property factory harmonizer. As noted earlier, when a data element is harmonized, harmonization recommendations are generated for its properties and propertyfields through its Context object. The workflow determines possible associations of property values that would constitute a new instance of a domain class. Property sets that are deemed to be valid are deemed to be harmonized for ownership purposes.

A goal of the factory process is to organize sets of data into discrete instances of a domain class. Once an instance of the domain class has been created, the harmonization process may perform further analysis of the data. During the factory process the data has not been assigned to an owner and the workflow is attempting to determine an appropriate grouping of data to create a new instance of a domain class. The new domain class may then be assigned to an owner. Once an owner is assigned the harmonization process is triggered, allowing the owner to further analyse the data for its suitability for use for a enterprise business application that consume the information. Sets that are deemed to be harmonized are instantiated as a new domain object. Others are queued for review. Again, the harmonizer implements the methods and the workflow provides the decision that determine how to group fields into the recommended sets and whether a set should be harmonized. When a new domain object is instantiated the model harmonizer is triggered to set the initial internal state of the new domain object. As such, the factory process only needs to make a decision on ownership, and does not need to make a complete determination of the internal state of the object.

Figure 6B:
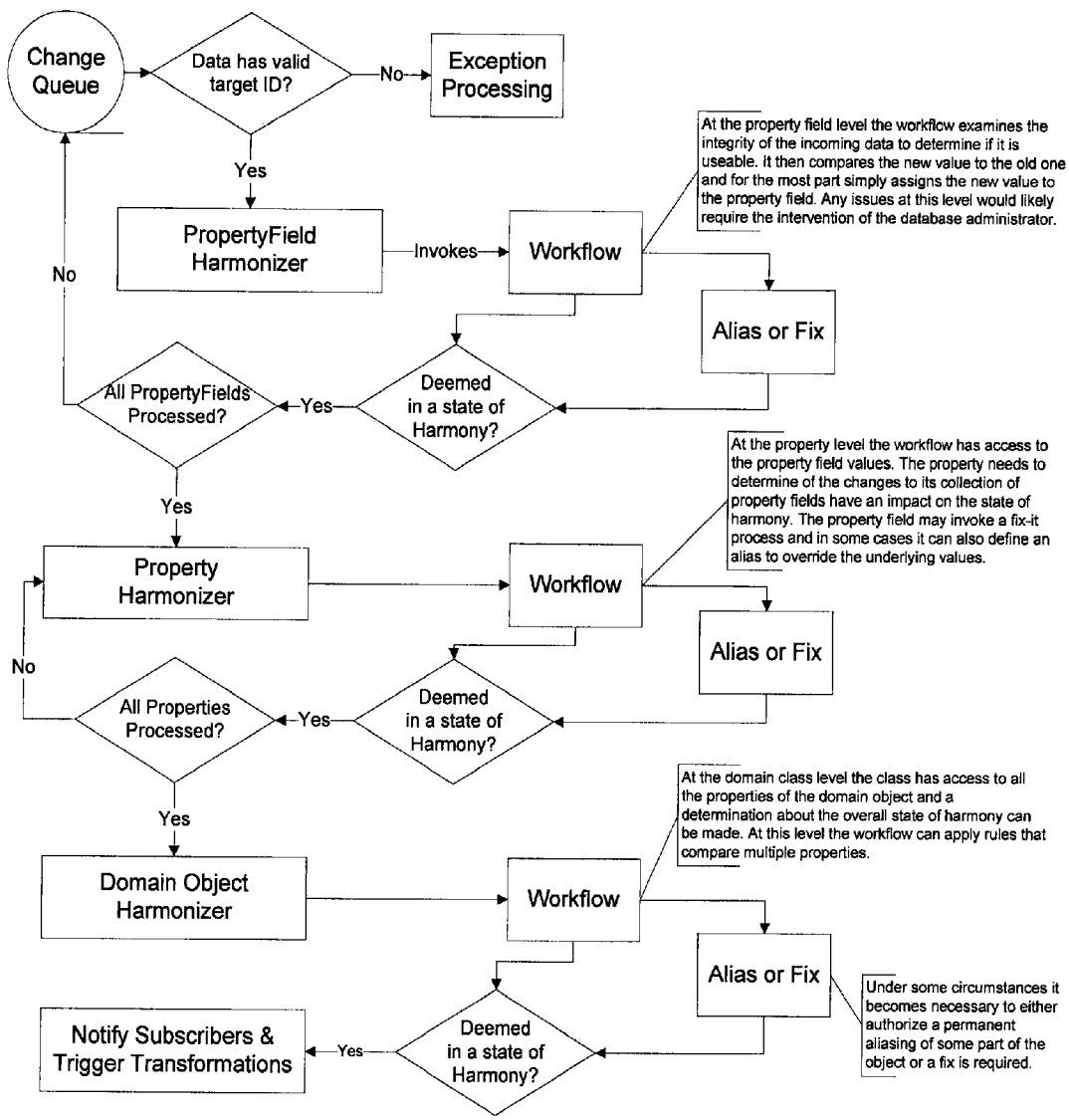
FIG. 6b is a flow chart of another mapping process to map domain objects used by the data management system of FIG. 1.

Referring to FIG. 6b, the model harmonizer process processes changes that occur to data that is already associated with an initialized domain object. As such a model harmonizer defines and then maintains the state of harmonization for a domain object that has clearly defined ownership.

The model harmonizer takes data from the change queue and processes the entries as follows. Again, the data is harmonized from the fundamental objects upward. So the propertyfield data is harmonized first. Therein, the data is checked to see whether it has a valid target ID. If not, the data is rejected. Next, if the data has a valid target ID, then the propertyfield harmonizer activated which invokes its set of workflow rules.

At the propertyfield level, the rules examine the integrity of the incoming data to determine if the data is useable, as defined by the related workflow. As part of this process, the harmonizer exposes a SCORE property that is set by the workflow along with a WEIGHT property that is controlled by the Class Level Workflow through its harmonizer. These two properties determine the state of harmonization that is ultimately controlled by two Boolean properties called HARMONIZED and STABLE, which are defined at the class level. An instance of a domain class may not be made available for use outside the data management system of an embodiment until its STABLE property becomes true, indicating that its owner has deemed it to be useable. The HARMONIZED property is set to be true if the owner determines that the class instance represents an accurate grouping of data. It then compares the new value to the old value. In most instances, where there is a discrepancy, the old value is overwritten in the propertyfield.

After the workflow is finished for that propertyfield the locally stored data is updated, either in the alias or fix fields. The owner of a domain class instance may determine that the value coming from a data source is invalid. If the underlying data source cannot be updated (for instance if the source of data comes from an external source that refuses to fix the data or if the data comes from an archived source that can no longer be modified), then the owner can update the data through an alias. In such a case, the owner can set the alias to override the data coming from certain propertyfields in order to provide a proper harmonized value.

Where data is deemed to require an update, a workflow of a domain class instance may initiate a request to fix the data in a source system. In the embodiment, fix requests may only be issued by workflows associated with domain classes and their instances. Typically, the process of fixing the data is external to the embodiment and it could be either automatic or manual. The embodiment tracks a "fixing" status for the external data to indicate whether an external fix request has been initiated or is in progress. When new data is received and its fixing flag is set (to true), the class level event is sent a FIXCHECK event to allow the workflow to verify whether the requested fix has been implemented. The final step is determine whether or not the data for the propertyfield is in a sufficient state of harmonization. Each propertyfield is processed in the same manner.

Once all propertyfields are processed, the property are harmonized through their workflow rules. At the property level, the workflow has access to the property field values. The property needs to determine what changes to its property fields impact the state of harmony. The property field may invoke a fix-it process and it may also define an alias to override underlying values. The workflow can determine: i) the types of changes that are allowed; ii) the thresholds for whether or not the state of harmony is affected; iii) whether the fix process invoked or not; iv) and other issues. The workflow can also determine whether or not the data for the propertyfield is in a sufficient state of harmonization. Each property is processed in the same manner.

It will be appreciated that the embodiment provides a set of data interface, data entry and reporting GUIs for an administrator of a data management system according to an embodiment allowing a user to define, update and receive reports on the changes and states of the data and their sources monitored by an embodiment.

Figure 7:
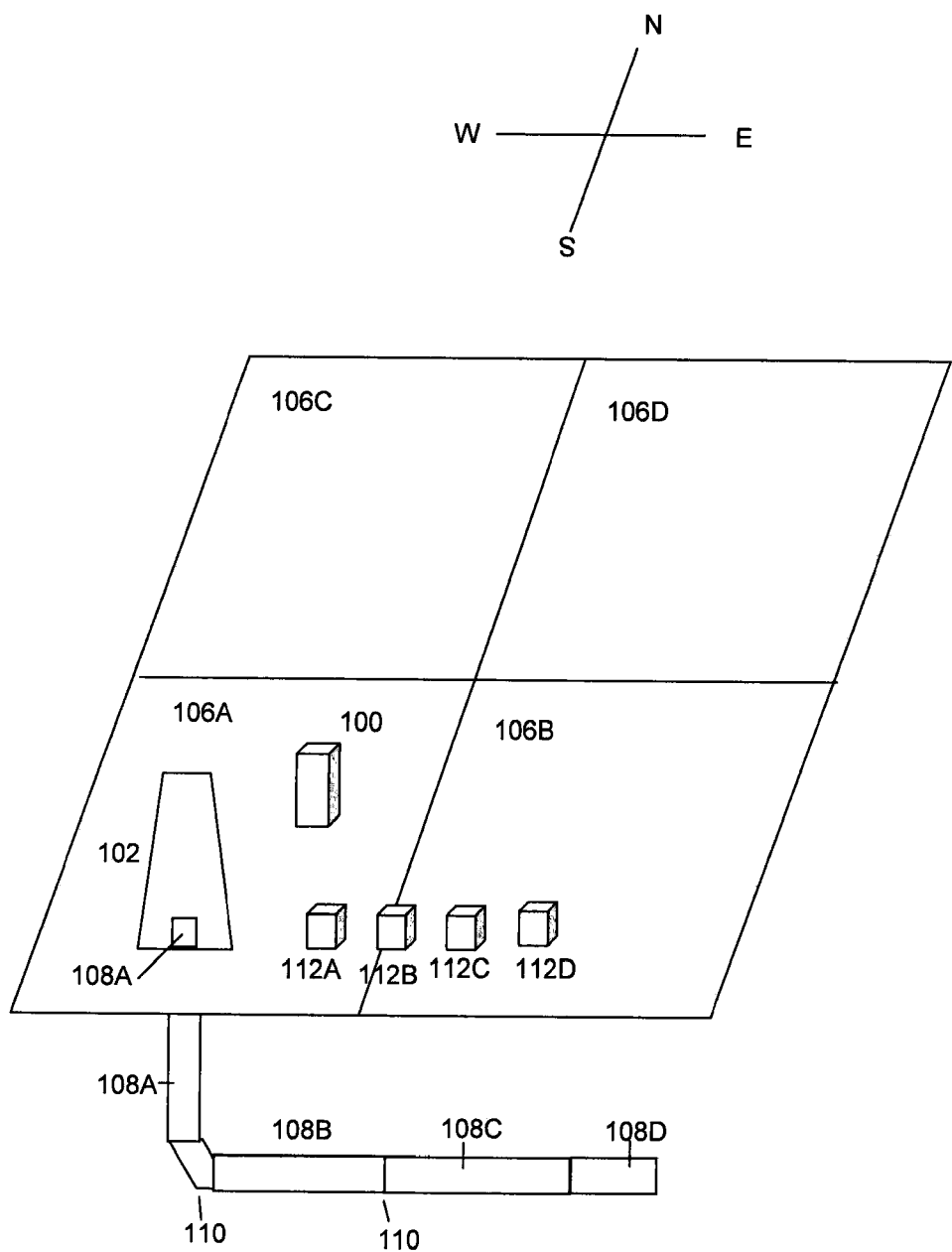
FIG. 7 is a schematic representation of an exemplary installation of a data management system of FIG. 1 for an oil drilling site having a series of operational, data and control tasks providing data on various aspects of the site.

Referring to FIG. 7, further detail of an embodiment is provided through an example. Therein, data management system 100 according to an embodiment is installed to manage project data associated with oil well site 102. Well site 102 has been approved to drill well 104 which traverses underground from land parcel 106A (where the well head of site 102 is located) westward underneath adjacent land parcel 106B. As is known in the art, well 104 is comprised of a series of connected casings 108A-C. Each casing is connected at a casing point 110. In the field of oil well production, a universal well identifier (UWI) is an identified used to label and track each casing point. As such, a well can be represented in data by a series of UWIs.

During the lifecycle of an oil well site, different administrative and management tasks will be involved. Different tasks will have different lifespans. As noted earlier, the tasks may include: planning and approval, drilling and construction, production and regulatory (e.g. from the EUB), shown as task management systems 112A-D. Data management system 100 is in communication with each task management system 112. Communications can be through wired or wireless connections, using data encryption and transmission techniques known in the art. An embodiment manages the flow of data and updates among task management systems 112 and system 100.

As an example of management and evaluation of data by an embodiment, consider an example involving planning task system 112A. Therein, its goals are to obtain the required land access approvals for a proposed drilling site. Planning task management system 112A manages and processes data functions relating to the task.

In the described data environment where a series of (possibly) interconnected task management systems need to have data consistency for selected data throughout all deemed relevant tasks for a project, an embodiment provides a system and method for managing such data. For example, in during the drilling phase, the actual well 104 may deviate from the original land access plan and may, in fact, cross under either or both or parcels 106C and 106D. This updated information may need to be reconciled with data from other tasks. A cascading impact may occur on other processes that use the data. For example, the actual location of well 104 may require new land access rights to be considered by planning task system 112A. As such, one aspect of an embodiment is that selected data from task management systems 112 is periodically retrieved by a central management system, such as data management system 100. Initially, a designer identifies the data elements that should be retrieved from a particular task (and its task management system 112), then that data is flagged by the particular task management system 112 to be forwarded to data management system 100. The data may be sent on a periodic basis (e.g. once a day) or on an event basis (e.g. once the well is in a production stage the availability of specific new data could trigger an immediate data event). The trigger for sending the data can vary after certain times or events, depending on the needs of the system.

Once the data is received by data management system 100 receives, it can queue the data or it can process the data immediately (depending on attributes associated with the data). Again, since the designer defined certain characteristics for the data, the data management system can evaluate the data and react according to (predetermined) conditions associated with the data. For example, an instance of the data may be stored in the data management system, when the "owning" task sends an updated version of the data. The system may compare the updated version against the stored version and determine whether the updated version should overwrite some or all aspects of the current version stored in the system. Also, if an update is executed, then there may be associated tasks that need to receive some or all of the updated information. Similarly, if a "non-owning" task sends an updated version of the data, then the system may have to evaluate the source of the data and determine whether or not to accept some or all of the changes, based on its defined attributes for the data. Each data from each task management system may have different characteristics associated with it, according to its own requirements.

Upon a certain condition (either a time or event condition), data management system 100 analyzes the assigned characteristics of the data. For example, the data may be flagged to be distributed to one or more task system 112. Additionally, the distribution may be controlled by certain conditions that require evaluation by system 100. These characteristics and parameters can be set in the overall characteristics defined for the data by the designer and codified in software.

Once a condition is satisfied to distribute the data to other task systems 112 or other elements in data management system 100, the data is pushed to the receiving system in an appropriate data transmission from system 100. Upon receipt of the pushed data, the receiving task system 112 is responsible for identifying from the data its associated characteristics. The task system is then responsible for determining what elements, conditions and data in its local database that need to be updated. In one embodiment, data management system 100 does not need to have write access to the local task management system 112. As such, updates can be managed locally. This arrangement provides a simplified the data management system and localized control of the data to the closest task management system associated with the data.

One feature of an embodiment is that harmonized data is provided for a set of databases that have common data elements therein. This allows for faster processing of data and can assist in reducing the number of data elements stored.

Figure 8:
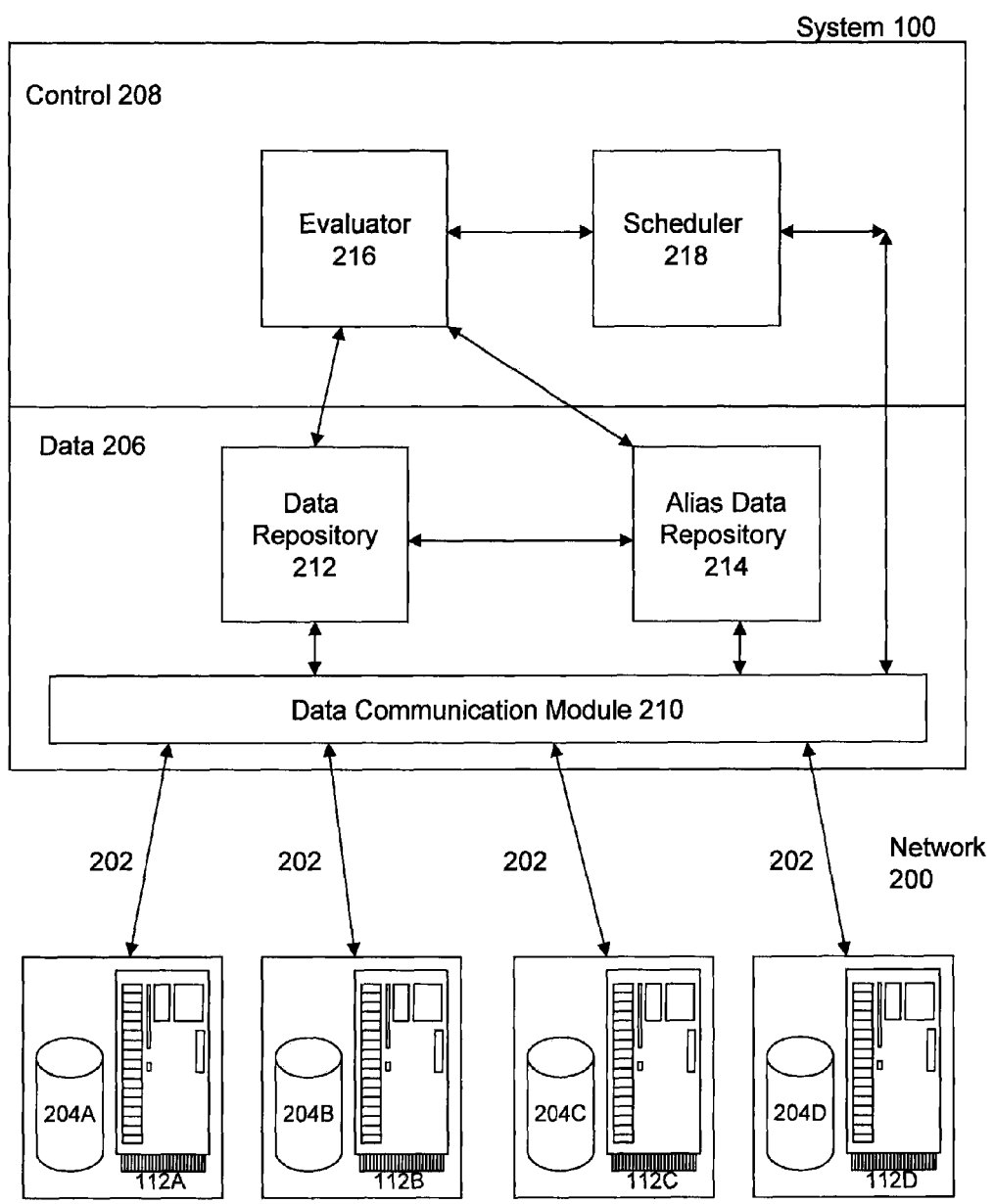
FIG. 8 is a block diagram of a network connecting the data management system of FIG. 1 for the application of FIG. 7.

Referring to FIGS. 1 and 8, further details are provided on the components, communications and connections related to system 100 and task management systems 112A-D. System 100 and systems 112A-D are connected in a network 200. Each system is a microprocessor-based computing platform having local memory storage (not shown), a microprocessors for executing programs (not shown) and a library of executable programs, algorithms, processes and other modules (not shown) that provide the functionality of the modules, system, components, etc. described herein. Workflows may be embodied into such algorithms. Data and object structures may be stored in one or more memory storage elements in the system(s). Each system 112 communicates with system 100 through communication link 202, which may be a wired or wireless connection, per connection systems known in the art. Each system has local data storage 204 where it maintains its local data.

Specifically flagged data in storage 204 from any task server 112 can be shared with other systems 112 and system 100 through network 200. For example, data that is to be shared from a task system 112A is provided to system 100 through communication link 202. System 200 has data processing module 206 and control module 208. Data processing module 206 comprises data communication module 210, (virtual) data repository 212 and alias cache 214. Control module has data evaluator module 216 and data transmission scheduler 218. Each module can send and receive control, status and data to another module (either on the control or data side) in system 100.

In data processing module 206, data communication module 210 has processes to receive data from links 202 and extract the payloads from any received data grams. As appropriate, module 210 packages the payload and provides it to either virtual repository 212 or cache 214. As noted earlier, harmonization process begins with the extraction of schema related information (the structure of the tables in the source databases), which is stored in the data repository. Once a domain model has been built the engine retrieves the content of the source databases based on the schema elements that are used on domain models. The content data is stored in the cache. Data repository 212 is a secondary data storage system, meant for long term data storage. Cache 214 is provided for relatively quick access to most recently and/or frequently accessed data. Cache 214 can access repository 212 and can update contents of repository 212, as required. The cache maintains a rolling snapshot that represents the last known state of the data. Individual data elements may have a more detailed data retained through rules in the domain model. In one embodiment, the cache retains only the most recent value for each element. Every time data is retrieved from the data sources the new data is compared to the previous value and a harmonization event is only triggered if the new data differs from the cached value. Once data has been passed to the domain model objects the repository provides persistent storage for the domain objects, including the data resulting from the harmonization process.

In control module 208, evaluator 216 has processes selectively extract or review data that is stored in either repository 212 or cache 214 and analyze its characteristics and associated traits. Depending on the analysis of the characteristics, with any associated conditions for the data, the evaluator may cause the data to be: moved from repository 212 to cache 214 (or vice versa), selected field(s) to be updated with certain values (and possibly be written to either or both of repository 212 and cache 214) and/or provide the data to scheduler 218 for (eventual) transmission from system 100 to one or more elements in network 200 through data communication module 210. Again, a domain model defines the domain objects that define the structure of the information to be harmonized and the rules that process the data. The objects use workflows to request changes to underlying source systems. Each request uses a queue to buffer communications.

Figure 9:
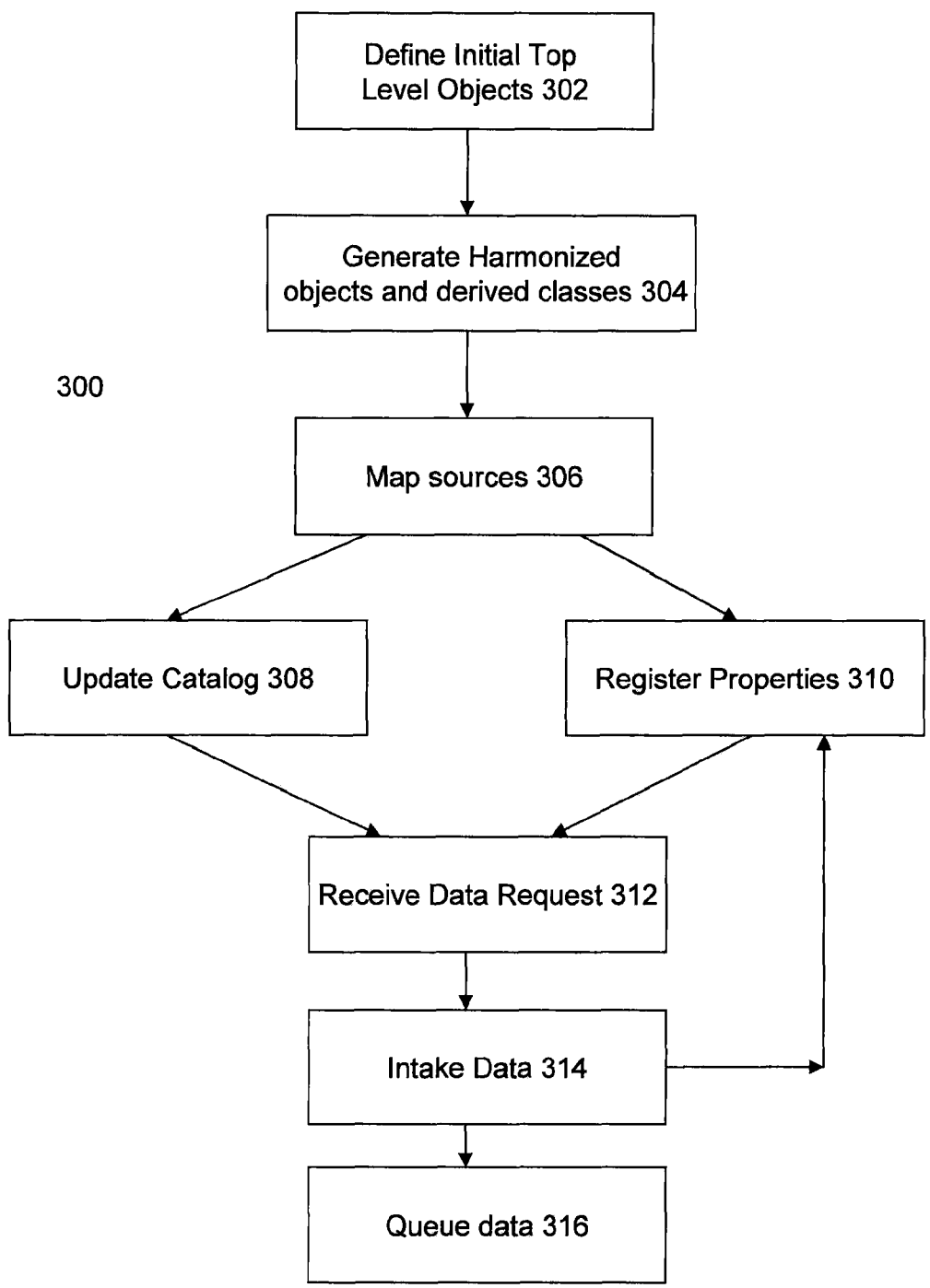
FIG. 9 is a flow diagram of a data mapping process used by the data management system of FIG. 1 to categorize processing data received from the application of FIG. 8.

Referring to FIGS. 1 and 9, further detail is now provided on operation of system 100 in processing data received from one task management system 110 for evaluation and (eventual) distribution one or more targeted elements in its network. First, in operation, system 100 has its repository initialized with data and status information for the data. Process 300 provides a set of rules that will establish an initial load for data management system 100, as executed by control module 208. After a domain model is defined, the instantiation of the model decides the domain object that each source data element belongs to. The initial load is used to validate and refine assignment rules that server as input to a sort of factory process that assemble source data into business objects. First, at step 302, the initial top level objects are defined. This is a business modeling exercise that defines notable top level business abstractions that define the way the business defines itself. This involves a customer modeling tool that allows an analyst to construct business objects and associate source data elements with the business objects. Next at step 304, harmonized objects and derived classes are generated. This is also referred to as the code generation step. This is a process of using the domain model defined in 302 and translating it into executable code that can dynamically process source data received through the data cache to create instances of the business domain objects. In one embodiment, code generation is a useful component in all future processing and workflows. The generated code—in an embodiment, it may be provided as a series of C# classes—is created to provide a workflow author an ability to use strong-typed naming conventions workflow rules are built in domain class instances. For example a domain name (e.g. "WELL") may be identified in the workflow modeling construct using an autocompletion routine such as IntelliSense (trade-mark) from Microsoft corporation. This domain name would enable a business or data modeler to start entering the name of the domain model. An autocompletion routine for the embodiment may then begin to fill in all of the under object names and associated child names. At this point the business objects typically have only minimal linkage to source data since all that is required is a single mapping for validation purposes. Next at step 306, the data sources are mapped to attempt to provide a full mapping of source data to business objects. The embodiment uses two key harmonization design rules here. First, a data field can be mapped to a business object property only once; this implies that in the end all data fields representing the same value should be mapped to single property. This is to ensure a clear ownership and resolution responsibility chain. Second, a business object property may be used to create a relationship to a property in another object to represent the fact that it utilizes a data element and has (ultimate) ownership of that element. The second rule complements the first and it ensures that data-rich business objects may express dependencies in the underlying data sources. After the data sources are mapped, two parallel step are executed: step 308 which updates the catalog and step 310 which registers the properties. Step 308 allows the harmony engine to figure what data elements should be extracted from source systems. This helps to ensure that only source data that is actually used in one of the domain models is extracted. Step 310 allows the harmony engine to know which object properties need to be notified when new data becomes available.

Upon completion of steps 308 and 310, the data environment for data management system 100 is established. At this point, a data request can be received per step 312. Thereafter, the data may be processed for receipt per step 314. One required data processing feature is the registration of its properties, so after the data in brought in, a command is sent to have the data registered, per step 310. In parallel, the final processing step for the data is to queue it to the appropriate queue in system 100. Again, the data cache retains the last valid value for comparison purposes in order to avoid triggering harmonization events when no data has actually changed. It will be appreciated that in other embodiments process 300 may be modified in the order of execution of steps, removal or additional of steps.

Figure 10:
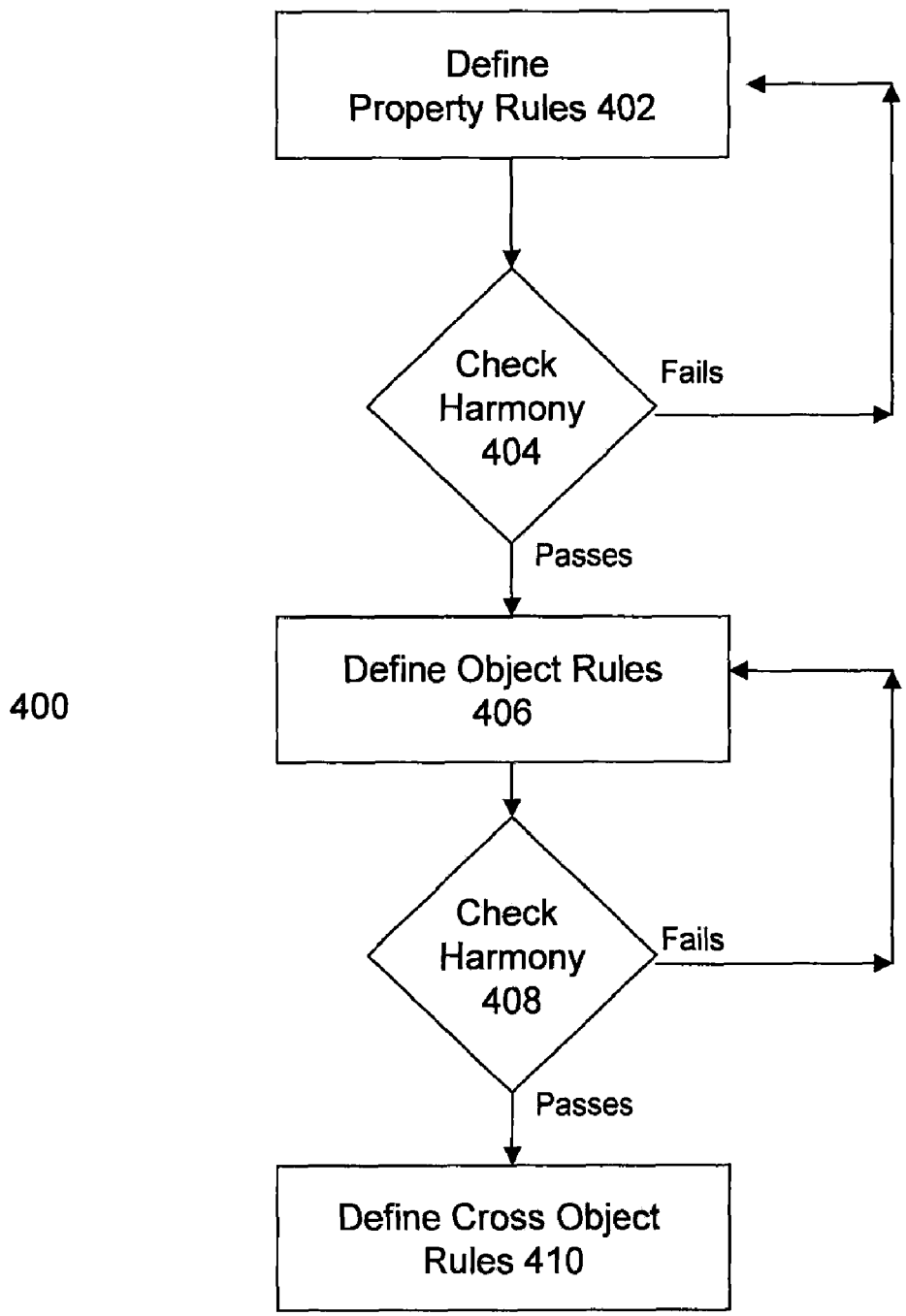
FIG. 10 is a flow diagram of a rule identification process used by the data management of FIG. 1 to identify distribution rules for data for the application of FIG. 8.

Referring to FIGS. 1 and 10, further detail is now provided on operation of system 100 in assigning ownership(s) for data and for defining data states in process 400. Clear ownership is used to resolve data discrepancies. A clear chain of ownership makes it possible for rules to raise issues up to a business user with the ability and authority to make a decision and resolve the issues. As part of this analysis, all parts of a domain model need to indicate their state of harmony; in essence each component has to be able to indicate whether the data that underpins it is trustworthy, and to what extent. First, at step 402, property rules for data are defined. As previously noted, in one embodiment hierarchy harmonizers are used. In one embodiment, every component of a domain model contains exactly one harmonizer. For example, each class has one harmonizer; each property of that class has one harmonizer; and each data field mapped to a property has one harmonizer. In other embodiments, harmonizers may be omitted for the "property" level. Each harmonizer may provide a workflow and/or a state-machine that control the state of harmony of its associated entity. Higher level harmonizers are only invoked if the collective state of the lower lever harmonizers represent a state deemed trustworthy by user-defined harmonization rules. As noted above, each harmonizer can trigger a workflow process to make changes, request a change authorization, and update subscribers on any state change. In an embodiment, since the domain model has been instantiatied as code generated c# classes, the harmonizer in the embodiment has easy strongly-typed access to the underlying domain model. This allows the domain business user to define very complex business rules without the need to remember the domain model. Next at step 404, the rules are checked against filters in data management system 100 for harmonization issues. If the check fails, then the rules are redefined in step 402. Harmonizer objects are responsible for defining what constitutes a state change and any workflows associated with required changes. Each harmonizer is limited to consider harmonization in the scope of the object associated with it. For instance a property harmonizer does not make any decisions based on the state of the class containing the property and it also does not consider harmonization issues affecting a single data field associated with the property. If the check passes, at step 406 the object rules for the are defined. Next, at step 408, again the object rules are checked against filters in data management system 100 for harmonization issues. If the check fails, then the rules are redefined in step 406. Finally, if the check passes, at step 410 the cross-object rules for the are defined.

Further features of an embodiment are illustrated through an example of processing of a data from a particular task system 112 to system 100. In the example, properties and triggers associated with the data in provided in Table A. The data may be stored by task system 112, transmitted to data communication module 210, stored by repository 212 and cache 214 and evaluated by evaluator 216.

TABLE A

| Field | Value |
|---|---|
| Administrative Details | |
| Name | these are dependent on the implementation |
| Location Description | |
| Current State/Owner of data | |
| Top UWI/Owner of data | |
| Bottom UWI/Owner of data | |
| Actual Depth/Owner of data | |
| Drill License Number/Owner of data | |
| Operator/Owner of data | |
| Coordinates/Owner of data | |
| Data Continuity Parameters | |
| Broadcast data information/ Frequency of broadcast Harmonization State Priority over what data? Subordinate to what data? Other data sources | |

The contents of Table A are transmitted from task system 112 to transmission module 210. After the data is stored in data module 208, its contents are selectively accessed by evaluator 216. Evaluator 216 examines selected fields in order to determine when, whether and how to have the data updated and information about its update transmitted to other elements in network 200.

It will be appreciated that the data management processes and other applications in the embodiments can be implemented using known programming techniques, languages and algorithms. Object-oriented data and program structures may be used to design and implement the components described herein. The titles of the modules are provided as a convenience to provide labels and assign functions to certain modules. It is not required that each module perform only its functions as described above. As such, specific functionalities for each application may be moved between applications or separated into different applications. Different signalling techniques may be used to communicate data and information between tasks and systems using known programming techniques. Data storage, access and update algorithms that allow data to be shared between applications may be used. Local copies of data may be stored by any of the modules and/or algorithm. Alternatively or additionally, remote access may be provided to data for a module.

Further, it will be appreciated that other embodiments may be provided to track different types of projects, such as large-scale construction projects (e.g. large highway systems, office buildings), large engineering projects (e.g. dam building, large scale demolitions) and other projects. For a specific environment, a set of tasks and data elements need to be defined and linked per the implementations described herein.

As used herein, the wording "and/or" is intended to represent an inclusive-or. That is, "X and/or Y" is intended to mean X or Y or both. Further, in this disclosure, where a dimension is provided as an approximate value (for example, when the dimension is qualified with the word "about"), a range of values will be understood to be valid for that range. For example, for a range stated as an approximate value, a range of about 20% larger and 20% smaller than the stated value may be used. Ranges of features are illustrative of embodiments and are not limiting unless noted.

Although the disclosure has been described with reference to certain specific embodiments, various modifications thereof will be apparent to those skilled in the art without departing from the scope of the disclosure as outlined in the claims appended hereto.

The invention claimed is:

1. A method for managing data provided from a plurality of systems, comprising:
   providing a set of objects for data;
   providing a set of classes for the data;
   maintaining a catalog with an entry for each data instance of the data;
   in the catalog, identifying for each data instance a source system and a level of harmonization with other data from the plurality of systems;
   applying a set of harmonization rules to the data to identify a group of related data and an owner of the group of data;
   identifying differences in instantiations in the group of data; and
   initiating an update request to an affected system of the plurality of systems having the differences, wherein the data is accessible by a central data processing system which stores a copy of the data and selectively initiates the update requests.

2. The method for managing data from a plurality of systems as claimed in claim 1, further comprising: providing a hierarchical schema data model to track and map the data.

3. The method for managing data from a plurality of systems as claimed in claim 2, further comprising:
    establishing one or more workflows to provide rules and thresholds used to evaluate whether the data has been harmonized or not.

4. The method for managing data from a plurality of systems as claimed in claim 3, further comprising:
    providing a domain model that is associated with the data that defines classes, properties and the set of harmonization rules for the schema data model;
    creating class libraries for use in the one or more workflows relating to the data; and
    assessing a level of harmonization following the set of harmonization rules for the group of data.

5. The method for managing data from a plurality of systems as claimed in claim 4, further comprising:
    mapping domain objects related to the domain model by creating a list of fields that are used by the domain model;
    organizing the list of fields by source tables;
    loading each schema source referenced in the list of fields list and instantiating an appropriate schema extraction driver; and
    queuing data retrieval requests for processing.

6. The method for managing data from a plurality of systems as claimed in claim 5, further comprising:
    determining whether or not to apply the set of harmonization rule to incoming data based on an evaluation of an integrity level for the incoming data;
    processing the data through the one or more workflows to determine whether the data has been harmonized or not; and
    generating a list of values from the data that have been identified as being acceptable by the one or more workflows.

7. The method for managing data from a plurality of systems as claimed in claim 6, wherein the catalog has a disposition field tracking the level of harmonization for the group of data.

8. The method for managing data from a plurality of systems as claimed in claim 7, wherein:
    the domain model has a property field linked to a property object; and
    the level of harmonization is determined from a comparison of a value for a property field for the data against properties of a property object associated with the property field.

9. The method for managing data from a plurality of systems as claimed in claim 8, further comprising:
    after processing the data through the one or more workflows, updating a copy of the data; and
    determining whether a value for the data is valid.

10. The method for managing data from a plurality of systems as claimed in claim 9, further comprising:
    when the level of harmonization indicates that the data requires an update, initiating from a workflow a request to correct the data in the affected system, wherein the workflow is associated with domain classes and instances of domain classes.

11. The method for managing data from a plurality of systems as claimed in claim 10, further comprising:
    upon receipt of the data from any system in the plurality of systems, searching the catalog for an entry of the data; and
    if a match is found, then replacing the entry with the data based on the set of harmonization rules and selectively broadcasting the data to the plurality of systems.

12. The method for managing data from a plurality of systems as claimed in claim 11, wherein the workflow determines at least one of:
    types of changes that are allowed to the data;
    a threshold for determining a level of harmony to the data; and
    a fix process to harmonize the data.

13. The method for managing data from a plurality of systems as claimed in claim 12, wherein the method is executed on a computer system.

14. A system for managing data provided from a plurality of external systems, comprising:
    a microprocessor;
    memory for storing the data;
    communication links to the plurality of external systems;
    a data structure stored in the memory providing a set of classes for the data;
    a catalog stored in the memory having an entry for each data instance of the data, the catalog providing an identification of a source system for each entry and a level of harmonization with other data from the plurality of systems;
    a harmonization module providing instructions executable on the microprocessor to:
        apply a set of harmonization rules to the data to identify a group of related data and an owner of the group of data;
        identify differences in instantiations in the group of data; and
        initiate an update request to an affected system of the plurality of systems having the differences, wherein the data is accessable by the system and the system stores a copy of the data and selectively initiates the update requests.

15. The system for managing data provided from a plurality of external systems as claimed in claim 14, further comprising:
    a hierarchical schema data model stored in the database to track and map the data.

16. The system for managing data provided from a plurality of external systems as claimed in claim 15, further comprising:
    one or more workflows providing instructions executable on the microprocessor defining rules and thresholds used to evaluate whether the data has been harmonized or not.

17. The system for managing data provided from a plurality of external systems as claimed in claim 16, further comprising:
    a domain model stored in the memory that is associated with the data that defines classes, properties and the set of harmonization rules for the schema data model; and
    at least one class library stored in the memory for use in the one or more workflows relating to the data, wherein the harmonization module further assesses a level of harmonization following the set of harmonization rules for the group of data.

18. The system for managing data provided from a plurality of external systems as claimed in claim 17, further comprising:
    a mapping of domain objects related to the domain model stored in the memory, wherein the mapping:
        has a list of fields that are used by the domain model; and
        organizes the list of fields by source tables, wherein the harmonization module further:
loads each schema source referenced in the list of fields list and instantiates an appropriate schema extraction driver, and
queues data retrieval requests for processing.

19. The system for managing data provided from a plurality of external systems as claimed in claim 18, wherein the harmonization module further:
determines whether or not to apply the set of harmonization rule to incoming data based on an evaluation of an integrity level for the incoming data;
processes the data through the one or more workflows to determine whether the data has been harmonized or not; and
generates a list of values from the data that have been identified as being acceptable by the one or more workflows.

20. The system for managing data provided from a plurality of external systems as claimed in claim 19, wherein the harmonization module comprises:
a first harmonizer applied to the domain model to determine assignment of new data field values to domain objects; and
a second harmonizer to process changes to data.

* * * * *